United States Patent
Rodriguez Bravo et al.

(10) Patent No.: US 11,653,209 B2
(45) Date of Patent: May 16, 2023

(54) IDENTIFYING POTENTIAL ATTACKS AGAINST CELLULAR NETWORKS

(71) Applicant: KYNDRYL, INC., New York, NY (US)

(72) Inventors: Cesar Augusto Rodriguez Bravo, Alajuela (CR); David Alonso Campos Batista, Aurora (CR); Craig M. Trim, Ventura, CA (US); Shikhar Kwatra, Durham, NC (US)

(73) Assignee: KYNDRYL, INC., New York, NY (US)

( * ) Notice: Subject to any disclaimer, the term of this patent is extended or adjusted under 35 U.S.C. 154(b) by 521 days.

(21) Appl. No.: 16/792,530

(22) Filed: Feb. 17, 2020

(65) Prior Publication Data

US 2021/0258792 A1   Aug. 19, 2021

(51) Int. Cl.
*H04W 12/00* (2021.01)
*H04W 12/122* (2021.01)
(Continued)

(52) U.S. Cl.
CPC .......... *H04W 12/122* (2021.01); *H04K 3/224* (2013.01); *H04W 12/06* (2013.01);
(Continued)

(58) Field of Classification Search
None
See application file for complete search history.

(56) References Cited

U.S. PATENT DOCUMENTS

| 9,113,391 B2 | 8/2015 | Gillett |
| 10,411,827 B2 | 9/2019 | Filson |

(Continued)

FOREIGN PATENT DOCUMENTS

| CN | 104066155 A | 9/2014 |
| CN | 107733913 A | 2/2018 |

(Continued)

OTHER PUBLICATIONS

"Cell Phone Jammers", © Phantom Technologies LTD 2018, 4 pps., <https://phantom-technologies.com/cell-phone-jammers>.

(Continued)

*Primary Examiner* — Abdelillah Elmejjarmi
(74) *Attorney, Agent, or Firm* — Dan Housley; Andrew M. Calderon; Calderon Safran & Cole, P.C.

(57) ABSTRACT

Aspects of the present invention disclose a method for identifying indications of an attack on a cellular network. The method includes one or more processors scanning a geographic area of a cellular network, wherein the geographic area includes a plurality of transceivers of the cellular network. The method further includes identifying a symptom that impacts a transceiver of the cellular network based at least in part on connectivity between a computing device and the plurality transceivers of the cellular network. The method further includes performing one or more assessments on the transceiver of the cellular network impacted by the symptom. The method further includes determining whether the symptom of the cellular network is associated with an attack on the cellular network based at least in part on the one or more assessments.

19 Claims, 3 Drawing Sheets

(51) Int. Cl.
*H04W 12/06* (2021.01)
*H04K 3/00* (2006.01)
*H04W 76/19* (2018.01)
*H04W 64/00* (2009.01)
*H04W 24/08* (2009.01)
*H04W 84/04* (2009.01)

(52) U.S. Cl.
CPC ........... *H04W 24/08* (2013.01); *H04W 64/00* (2013.01); *H04W 76/19* (2018.02); *H04K 2203/22* (2013.01); *H04W 84/042* (2013.01)

(56) References Cited

U.S. PATENT DOCUMENTS

| | | | |
|---|---|---|---|
| 2012/0309288 A1* | 12/2012 | Lu ........................... | H04K 3/45 455/1 |
| 2018/0020418 A1 | 1/2018 | Chandramouli | |
| 2018/0332659 A1 | 11/2018 | Hwang | |
| 2019/0132787 A1* | 5/2019 | Ryan ..................... | G06K 9/6223 |
| 2019/0215730 A1 | 7/2019 | Qiao | |
| 2021/0037489 A1* | 2/2021 | Takahashi ............ | H04J 11/0076 |
| 2021/0136585 A1* | 5/2021 | Rosberg ................ | H04W 24/08 |

FOREIGN PATENT DOCUMENTS

| | | |
|---|---|---|
| CN | 108419286 A | 8/2018 |
| WO | 2017211289 W | 12/2017 |

OTHER PUBLICATIONS

"IMSI Catchers", Privacy International, Downloaded from the Internet on Jan. 3, 2020, 1 pp., <https://privacyinternational.org/explainer/2222/imsi-catchers>.

"IMSI-catcher", From Wikipedia, the free encyclopedia, 7 pps., last edited on Dec. 5, 2019, <https://en.wikipedia.org/wiki/IMSI-catcher#cite_note-:1-2 >.

"Jamming and Anti-jamming Techniques in Wireless Networks: A Survey", 16 pps., Int. J. Ad Hok Ubiquitous and Computing, vol. 17, No. 4, pp. 197-215, 2014, <https://www.cs.montana.edu/yang/paper/jamming.pdf >.

"Portable Cell Phone Jammers", © 2017 Jammer-Store.com, 13 pps , <https://www.jammer-store.com/gsm-blockers-jammers/>.

Brandom, "Phony cell towers are the next big security risk", The Verge, Sep. 18, 2014, 3 pps., <https://www.theverge.com/2014/9/18/6394391/phony-cell-towers-are-the-next-big-security-risk>.

Goodin, "Low-cost IMSI catcher for 4G/LTE networks tracks phones' precise locations", Ars Technica, Oct. 28, 2015, ©2020 Condé Nast, 5 pps., <https://arstechnica.com/information-technology/2015/10/low-cost-imsi-catcher-for-4glte-networks-track-phones-precise-locations/>.

Jover, "Security Attacks Against the Availability of LTE Mobility Networks: Overview and Research Directions", ISSN:1882-5621/13/©2013 NICT, 9 pps., <https://ieeexplore.ieee.org/document/6618585>.

Lu et al., "UAV-Aided Cellular Communications with Deep Reinforcement Learning Against Jamming", 6 pps., Apr. 23, 2019, <https://arxiv.org/pdf/1805.06628.pdf>.

Shaik et al., "Practical Attacks Against Privacy and Availability in 4G/LTE Mobile Communication Systems", NDSS 16, Feb. 21-24, 2016, San Diego, CA, USA Copyright 2016 Internet Society, ISBN 1-891562-41-X, 16 pps., <https://arxiv.org/pdf/1510.07563.pdf>.

Stahlberg, "Radio Jamming Attacks Against Two Popular Mobile Networks", 20 pps., HUT TML 2000, Tik-110.501 Seminar on Network Security, 20 pps., <http://rageuniversity.com/PRISONESCAPE/JAMMING%20RADIO%20GSM%20TETRA/Radio%20Jamming%20Attacks%20Mobile%20NETWORKS.pdf>.

* cited by examiner

IDENTIFYING POTENTIAL ATTACKS AGAINST CELLULAR NETWORKS

BACKGROUND OF THE INVENTION

The present invention relates generally to the field of security for mobile devices, and more particularly to identifying attacks in a cellular network.

In recent years cellular networks have become a critical part of our information infrastructure. A cellular network or mobile network is a communication network where the last link is wireless. Wireless networking plays an important role in achieving ubiquitous computing where network devices embedded in environments provide continuous connectivity and services, thus improving human's quality of life. However, due to the exposed nature of wireless links, current wireless networks can be easily attacked by jamming technology.

Jamming in wireless networks is defined as the disruption of existing wireless communications by decreasing the signal-to-noise ratio at receiver sides through the transmission of interfering wireless signals. Jamming can cause Denial-of-Service (DoS) problem which may result in several other higher-layer security problems. Jamming is the intentional interference is usually conducted by an attacker who intends to interrupt or prevent communications in networks.

An international mobile subscriber identity-catcher, or IMSI-catcher, is an eavesdropping device used for intercepting mobile device traffic and tracking location data of mobile device users. Essentially a "fake" mobile tower acting between the target mobile device and a valid tower of the cellular network of the service provider, the utilization of the "fake" tower is considered a man-in-the-middle (MITM) attack. Although, the current wireless standards offer some risk mitigation due to mutual authentication required from both the mobile device and the network. However, sophisticated attacks may be able to downgrade current network services to non-LTE network services which do not require mutual authentication.

SUMMARY

Aspects of the present invention disclose a method, computer program product, and system for identifying indications of an attack on a cellular network. The method includes one or more processors scanning a geographic area of a cellular network, wherein the geographic area includes a plurality of transceivers of the cellular network. The method further includes one or more processors identifying a symptom that impacts a transceiver of the cellular network based at least in part on connectivity between a computing device and the plurality transceivers of the cellular network. The method further includes one or more processors performing one or more assessments on the transceiver of the cellular network impacted by the symptom. The method further includes one or more processors determining whether the symptom of the cellular network is associated with an attack on the cellular network based at least in part on the one or more assessments.

DETAILED DESCRIPTION

Embodiments of the present invention allow for identifying indications of an attack on a cellular network. Embodiments of the present invention utilize a mobile platform to identify a jammer-based attack on a cell of a cellular network. Embodiments of the present invention deploy a plurality of actions in coordination with a cell tower of a cellular network to determine whether a jammer-based attack is impacting the cell tower. Additionally, embodiments of the present invention identify a source of the jammer-based attack impacting the cell tower. Additional embodiments of the present invention utilize a mobile platform to identify an international mobile subscriber identity-based attack on a cellular network.

Some embodiments of the present invention recognize that the rise in the exploitation vulnerabilities in cellular network security measures have created a greater demand to detect attacks against cellular networks. For example, devices (e.g., jammers, international mobile subscriber identity (IMSI)-catchers, etc.) have become more readily available as technology advances. Thus, consumers are capable to utilize these devices to carry-out attacks against information infrastructures such as cellular networks that result in massive disruptions in data transmissions. Various embodiments of the present invention provide an autonomous vehicle-based platform to determine whether a component of an information infrastructure is under attack by identifying symptoms that indicate an attack using a plurality of assessments.

Various embodiments of the present invention can operate to prevent reduced network performance and connectivity loss due to a denial-of-services (DoS) attack by identifying a source of a jamming attack and alerting a network administrator of the DoS attack. In additional embodiments, the present invention can operate to increase network security of a cellular network by identifying and eliminating invalid nodes of the cellular network utilized to perform IMSI-based attacks. Additionally, embodiments of the present invention improve current network monitoring systems by providing a mobility capability that is utilized to more accurately identify a geolocation that corresponds to a source of an attack within a cellular network.

Implementation of embodiments of the invention may take a variety of forms, and exemplary implementation details are discussed subsequently with reference to the Figures.

Figure 1:
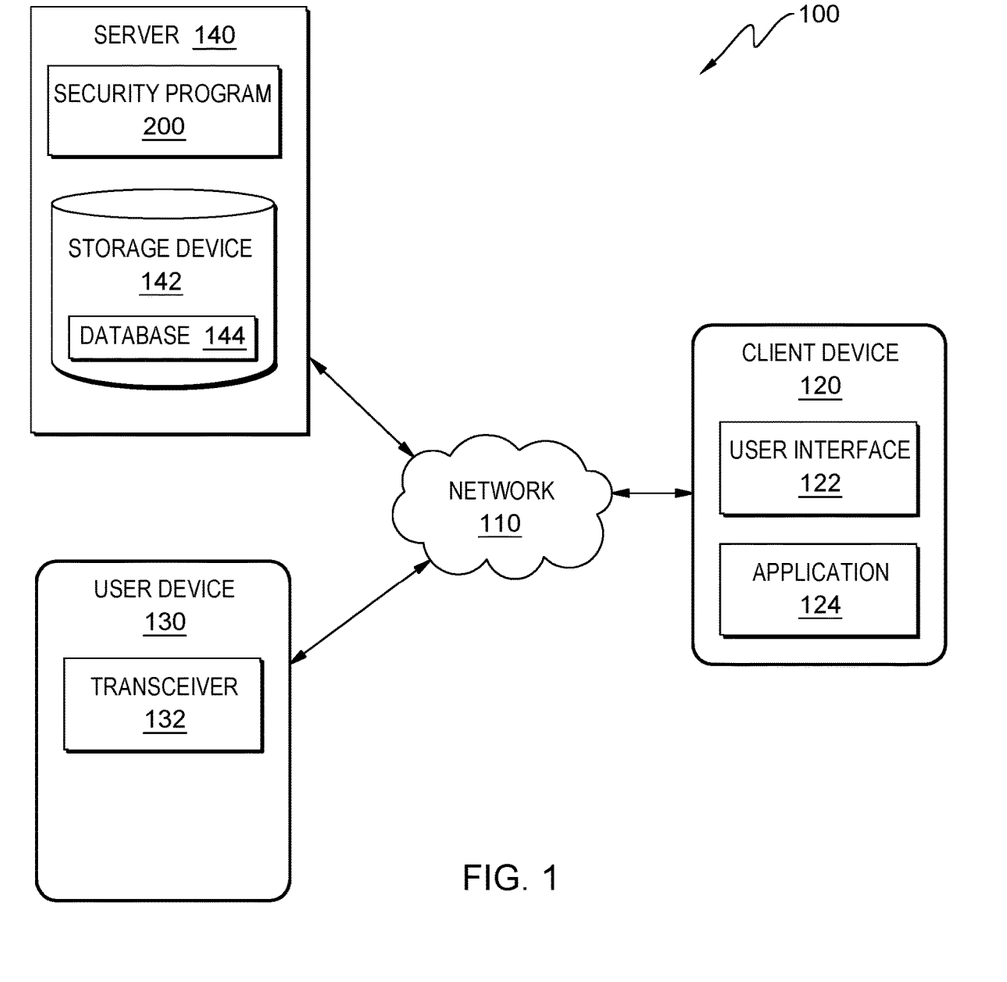
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Security program 200 enables the authorized and secure processing of personal data. Security program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Security program 200 provides information regarding personal data and the nature (e.g., type, scope, purpose, duration, etc.) of the processing. Security program 200 provides the user with copies of stored personal data. Security program 200 allows the correction or completion of incorrect or incomplete personal data. Security program 200 allows the immediate deletion of personal data.

Distributed data processing environment 100 includes server 140, user device 130, and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, user device 130, client device 120, and other computing devices (not shown) within distributed data processing environment 100. In various embodiments of the present invention a cellular network (e.g., network 110) can include a base station subsystem that includes a base transceiver station (BTS) (e.g., cell tower, antenna, etc.), base station controller (BSC) (e.g., Radio Network controller (RNC)), packet control unit, and/or base station subsystem interfaces. Additionally, various embodiments of the present invention can apply to various network standards (e.g., 2G, 3G, 4G, 5G, etc.).

Client device 120 can be one or more of a laptop computer, a tablet computer, a smart phone, smart watch, a smart speaker, unmanned aerial vehicle (UAV), or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 may include one or more a processor, user interface 122 and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of security program 200.

In various embodiments of the present invention, user device 130 may be a radio frequency transmitter, transceiver, virtual base transceiver station (VBTS), or any device capable of receiving and transmitting radio frequency signals known in the art. In general, user device 130 is representative of any electronic device or combination of electronic devices capable of wireless communication. User device 130 may include components as depicted and described in further detail with respect to FIG. 3, in accordance with embodiments of the present invention.

User device 130 may include transceiver 132, which is a device comprising both a transmitter and a receiver that are combined and share common circuitry or a single housing. In various embodiments of the present invention transceiver 132 includes a radio transmitter and/or receiver. For example, transceiver 132 can be a jamming device utilized to transmit signals to a cell tower of a cellular network (e.g., network 110) that intentionally interfere with the cell tower to block legitimate communications. In another example, transceiver 132 can be an international mobile subscriber identity (IMSI) catcher (e.g., VBTS) utilized to intercept data of mobile device users utilizing a cellular network (e.g., network 110).

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120, user device 130, and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and security program 200. Storage device 142 can be implemented with any type of storage device, for example, persistent storage 305, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores a plurality of information, such as database 144. Database 144 may represent one or more organized collections of data stored and accessed from server 140. For example, database 144 includes number of subscribers connected to a cellular tower, cellular tower subscriber capacity, cellular tower status, coverage maps of an internet service provider (ISP), geolocations, request response times, and/or authentication requirements of network elements. In one embodiment, data processing environment 100 can include additional servers (not shown) that host additional information that accessible via network 110.

In various embodiments of the present invention security program 200 can utilize a UAV (e.g., client device 120) to monitor a cellular network (e.g., network 110) and perform real-time assessments to identify an attack on the cellular network. Additionally, various embodiments of the present invention disclose security program 200 as a mobile platform (e.g., a UAV, mobile device, etc.) that communicates with a server via a client-side application (e.g., application 124) to retrieve information utilized to perform assessments of identified symptoms of a cellular network. In one embodiment, security program 200 utilizes client device 120 to identify a symptom indicating a security threat to network 110. For example, security program 200 utilizes a client-side application (e.g., application 124) of a UAV (e.g., client device 120) to attempt to connect to one or more cell towers of a cellular network (e.g., network 110). In this example, security program 200 determines whether the UAV is experiencing connectivity issues (e.g., unable to connect, timeouts, latency, etc.) with a cell tower of the cellular network by correlating the UAV and the cell tower of the cellular network. In another example, security program 200 a mobile device (e.g., client device 120) of a user to scan (e.g., request availability) a geographic area of a cellular network (e.g., network 110) for one or more base transceiver stations (BTS) of the cellular network to connect to.

In another embodiment, security program 200 determines whether an identified symptom indicates an attack on network 110. For example, security program 200 correlates subscriber capacity and connected subscriber data of a cell tower of a cellular network (e.g., network 110) to determine whether a UAV (e.g., client device 120) is experiencing connectivity issues with the cell tower due to an attack (e.g., jamming attack) or due to the cell tower having reached subscriber capacity. In this example, security program 200 utilizes the subscriber capacity of the cell tower to determine whether the connectivity issues of the UAV are valid (i.e., determine whether the number of connected subscribers are equal to or greater than the subscriber capacity of the cell tower). In another example, security program 200 correlates an availability status of one or more BTSs received by a mobile device (e.g., client device 120) to a cellular tower (e.g., BTS) distribution map of a cellular network (e.g., client device 120) to determine whether the cellular network includes an unauthorized cellular tower (e.g., VBTS).

In another embodiment, security program 200 performs a task associated with identifying an attack on network 110. For example, if security program 200 reboots a cell tower of a cellular network (e.g., network 110) and determines that connectivity issues of a UAV (e.g., client device 120) with the cell tower of the cellular network is related to a jamming attack, then security program 200 can identify a geolocation of a source of the jamming attack. In another example, if security program 200 determines that a mobile device (e.g., client device 120) is experiencing a man-in-the-middle (MITM) attack, then security program 200 can identify a location of and disable a virtual base transceiver station (VBTS) causing the MITM attack.

Figure 2:
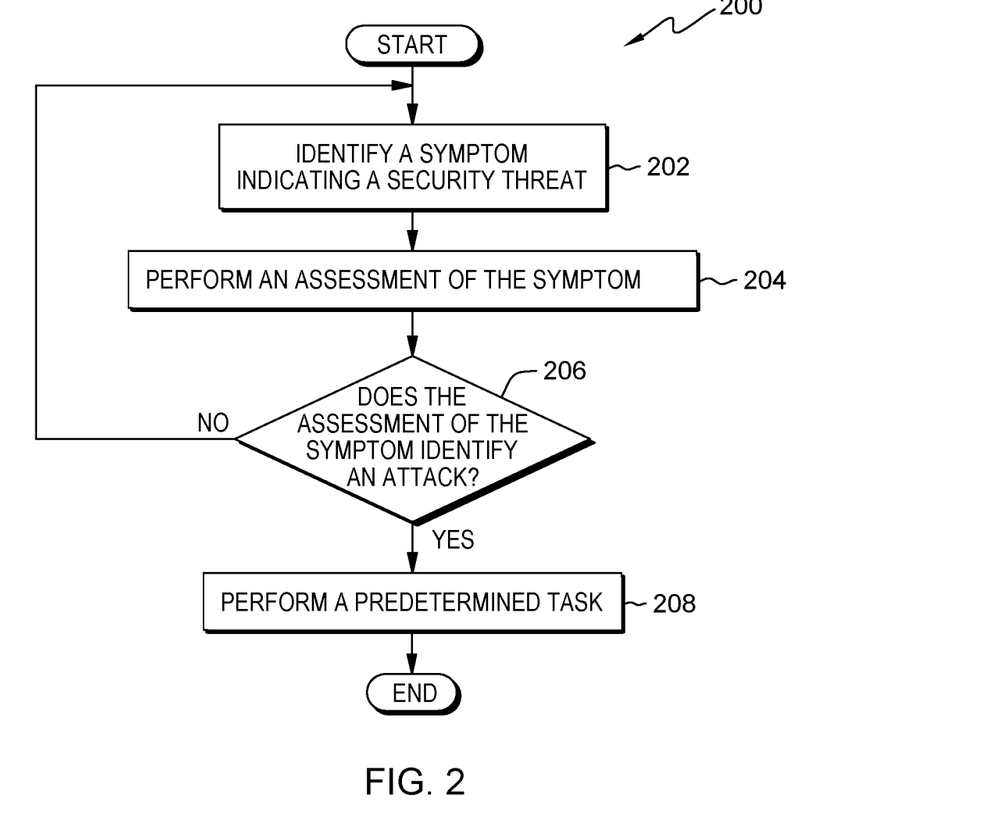
FIG. 2 is a flowchart depicting operational steps of a program, within the data processing environment of FIG. 1, for identifying indications of an attack on a cellular network, in accordance with embodiments of the present invention.

FIG. 2 is a flowchart depicting operational steps of security program 200, a program that identifies indications of an attack on a cellular network, in accordance with embodiments of the present invention. In one embodiment, security program 200 initiates in response to client device 120 attempting to connect to network 110. For example, security program 200 initiates in response to a UAV (e.g., client device 120) transmitting an authentication request to a cell tower of a cellular network (e.g., network 110). In another embodiment, security program 200 is a background application that continuously monitors client device 120. For example, security program 200 monitors connections of a UAV (e.g., client device 120) with one or more cell towers of a cellular network (e.g., network 110) as the UAV traverses the cellular network.

In step 202, security program 200 identifies a symptom indicating a security threat. In one embodiment, security program 200 utilizes client device 120 to identify a symptom indicating a threat to network 110. For example, security program 200 uses an onboard application (e.g., application 124) of a UAV (e.g., client device 120) to identify a connectivity status of the UAV with a BTS (e.g., cell tower) of a cellular network (e.g., network 110). In this example, security program 200 identifies the UAV is connected to the BTS, opens a web-based application (e.g., browser) of the UAV and attempts to navigate the Internet. Furthermore, security program 200 detects that a URL is failing to load and determines that the UAV is experiencing issues with limited connectivity (i.e., connected but unable to navigate web applications). In another example, security program 200 uses a client-side application (e.g., application 124) of a mobile device (e.g., client device 120) to identify the mobile devices inability to connect (e.g., symptom) to a BTS (e.g., cell tower) of a cellular network (e.g., network 110). In this example, security program 200 can determine whether the UAV is experiencing connectivity issues with the BTS by identifying the number of attempts made to connect with the BTS being above a system threshold (i.e., client device 120 is unable to connect to network 110).

In yet another example, security program 200 uses an onboard application (e.g., application 124) of a UAV (e.g., client device 120) to identify latency issues with a request of the UAV through a BTS (e.g., cell tower) of a cellular network (e.g., network 110). In this example, security program 200 compares the time that elapses from the time the request of the UAV is sent to a recipient (e.g., BSC, server, website, etc.) to reach the recipient and a response to the request is returned. In addition, security program 200 compares the elapsed time of the request to a system time of the cellular network or connection (e.g., threshold value) for requests to determine that a latency issue exist when using the BTS. Additionally, security program 200 can identify an authentication symptom of the cellular network by determining whether the UAV receives a valid response to a network authentication request from the BTS.

In step 204, security program 200 performs an assessment of the symptom. In one embodiment, security program 200 evaluates a symptom of network 110. For example, security program 200 correlates connectivity data (e.g., inability to connect, limited connectivity, latency, timeouts, etc.) of a UAV (e.g., client device 120) with data of a BTS (e.g., cell tower) of a cellular network (e.g., network 110). In this example, security program 200 utilizes the capacity (e.g., total number of simultaneous subscribers) of the BTS and number of subscribers connected to the BTS to determine whether the BTS is above capacity. Additionally, the capacity of the BTS may be used as threshold to indicate whether connectivity issues are valid. In an alternative example, security program 200 can correlate the connectivity data of a mobile device (e.g., client device 120) with a retrieved status (e.g., green, red, etc.) of the BTS from a server of an internet service provider (ISP) that includes outage information of a coverage map. In this example, security program 200 can identify an inconsistency between the retrieved status of the mobile device and outage information of the coverage map.

In another example, security program 200 utilizes an onboard application (e.g., application 124) of a UAV (e.g., client device 120) to connect to a BTS of a base station subsystem. In this example, security program 200 transmits a request to the BTS to access a base station controller (BSC) (e.g., Radio Network controller (RNC)) of the base station subsystem and uses request tracing to determine whether an identified latency issue of the BTS is greater than a system threshold. Security program 200 can utilize the system threshold to indicate whether the identified latency issues are valid. Furthermore, security program 200 can utilize request tracing logs, which include status codes, execution times, paths, forms of authentication, etc., for the request to correlate against a system threshold to determine whether an execution time of the request exceed the system threshold (i.e., determining whether the identified latency issue is valid). Additionally, the system threshold can include a determined number of network elements (e.g., connections) that the request should encounter on a delivery path to the RNC, or an execution time of the access request based on network structure or connection capabilities (i.e., either may be used to define the system threshold).

In an alternative example, security program 200 can use the UAV to connect to the BTS and enforce the BTS to respond to a network authentication request of the UAV (i.e., mutual authentication, ensuring that network 110 authenticates with client device 120 as well). In this example, if the BTS does not respond or provides an invalid response to the network authentication request of the UAV, then security program 200 may flag this authentication failure (e.g., symptom) as a possible IMSI-based attack.

In yet another example, security program 200 uses a UAV (e.g., client device 120) to scan a geographical area of a cellular network (e.g., network 110) that includes a plurality of base transceiver stations to determine which of the base transceiver stations are available. Additionally, security program 200 retrieves a coverage map from a server of an ISP that includes the geographic area the UAV is currently scanning and locations of authorized BTSs of the cellular network. In this example, security program 200 can correlate one or more BTSs identified in the UAV scan with the coverage map of the ISP to determine whether an unauthorized BTS is present in the scanned geographic area of the cellular network of the ISP.

In another embodiment, security program 200 utilizes a plurality of assessments to determine whether network 110 is vulnerable to additional security threats. For example, if a BTS of a cellular network (e.g., network 110) is defaulted back to factory settings due to an update, physical maintenance, debugging without rolling back to a secured password, or a brute force attack, then security program 200 can utilize an onboard application (e.g., application 124) of a UAV (e.g., client device 120) to connect to the BTS and verify that the BTS remains protected by a secure password. Additionally, security program 200 may utilize the onboarding application to determine whether all authentication mechanisms of the BTS are functioning as expected (e.g., international mobile equipment identity (IMEI) authentication, 4G authentication procedures, 5G authentication procedures, etc.). Furthermore, security program 200 executes a plurality of assessments to identify services of the cellular network that allow anonymous connections and disables anonymous connection settings.

In decision step 206, security program 200 determines whether the assessment of the symptom identifies an attack. In various embodiments of the present invention, security program 200 determines whether an identified symptom of network 110 indicates an attack. In one embodiment, security program 200 utilizes data of network 110 to determine whether an identified symptom of network 110 is related to an attack. For example, security program 200 compares a total number of subscribers (e.g., network data) connected to a BTS of a cellular network (e.g., network 110) to a subscriber capacity (e.g., network data) of the BTS to determine whether a connectivity issue (e.g., inability to connect, limited connectivity, etc.) is related to an attack. In this example, security program 200 determines whether the total number of subscribers connected to the BTS is equal to or greater than the subscriber capacity of the BTS, which may indicate whether the connectivity issue is related to the attack. In an alternative example, security program 200 uses a status (e.g., the color green for available and the color red for operating at capacity) of a BTS from a coverage map of an ISP to determine whether the connectivity issue is related to an attack.

In another example, security program 200 uses request tracing logs to compare the number of network elements (e.g., BTS, interfaces, etc.) of a path through one or more network elements of a cellular network (e.g., network 110) of a request by a mobile device (e.g., client device 120) to access an RNC to a system threshold number of elements. In this example, security program 200 determines whether the path of the request to access the RNC traverses more network elements than a threshold value of network elements of the cellular network, which can indicate whether an identified latency issue is related to the attack (i.e., determining whether network 110 includes unauthorized network elements and as a result increase execution time of requests).

In yet another example, security program 200 compares a coverage map that includes authorized BTSs to data (e.g., BTSs identified via an area scan) of a UAV (e.g., client device 120) to determine whether identified latency issues of a BTS is related to an attack on a cellular network (e.g., network 110). In this example, security program 200 determines whether a comparison of geolocations of BTSs of the coverage map and the BTSs of the UAV scan include a BTS that does not correlate to the coverage map. Additionally, security program 200 can request an identification number of the BTS to verify whether the BTS is an authorized element of the cellular network (i.e., determining whether network 110 includes an unauthorized virtual base transceiver station (VBTS) and as a result increase execution time of requests).

If security program 200 determines that an identified symptom of network 110 is not related to an attack (decision step 206, "NO" branch), then security program 200 continues to utilize client device 120 to monitor network 110 for symptoms. In one scenario, security program 200 determines that a UAV (e.g., client device 120) is unable to connect (e.g., connectivity issue, identified symptom, etc.) to a BTS of a cellular network (e.g., network 110) and a number of subscribers connected to the BTS of the cellular network is greater than or equal to a subscriber capacity (e.g., total number of simultaneous subscribers, defined threshold, etc.) of the BTS of the cellular network. In this scenario, security program 200 determines that the UAV being unable to connect to the BTS of the cellular network is not related to an attack, and security program 200 logs this information for archiving in a database (e.g., database 144) of a server.

In another scenario, security program 200 determines that tracing logs of a request of a mobile device (e.g., client device 120) for access to an RNC (e.g., BSC) of a base station subsystem indicates that a path of the request for access to the RNC includes one (1) BTS prior to gaining access to the RNC, which is equal to a system threshold based on the structure of a cellular network (e.g., network 110). In this scenario, security program 200 determines that an identified latency issue of the mobile device is not related to an attack (i.e., connectivity issues are not related to an unauthorized element (e.g., a VBTS) being present in network 110), and security program 200 logs this information for archiving in a database (e.g., database 144) of a server.

If security program 200 determines that an identified symptom of network 110 is related to an attack (decision step 206, "YES" branch), then security program 200 performs a predetermined task. In one scenario, security program 200 determines that a UAV (e.g., client device 120) is unable to connect (e.g., connectivity issue, identified symptom, etc.) to a BTS of a cellular network (e.g., network 110) and that a number of subscribers connected to the BTS of the cellular network is less than a subscriber capacity (e.g., total number of simultaneous subscribers, defined threshold, etc.) of the BTS of the cellular network. In this scenario, security program 200 determines that the UAV being unable to connect to the BTS of the cellular network is related to a jamming attack (i.e., connectivity issue is related to user device 130 interfering with network 110). Accordingly, security program 200 can alert a user or ISP and/or identify a geolocation of a device performing the jamming attack.

In another scenario, security program 200 determines that tracing logs of a request of a mobile device (e.g., client device 120) for access to an RNC (e.g., BSC) of a base station subsystem indicates that a path of the request for access to the RNC includes two (2) BTSs prior to gaining access to the RNC, which is greater than a system threshold of one (1) BTS based on the structure of a cellular network (e.g., network 110). In this scenario, security program 200 determines that an identified latency issue of the mobile device is related to a IMSI-based attack (i.e., connectivity issues are related to an VBTS being present in a geographic area of network 110). Additionally, security program 200 can alert a user or ISP, transmit all available metadata (e.g., location, authentication processes, identification numbers, etc.) of the IMSI-based attack (e.g., MITM attack), and/or identify a geolocation of an unauthorized network element performing the IMSI-based attack.

In step 208, security program 200 performs a predetermined task. In one embodiment, security program 200 utilizes network 110 to identify a geolocation of user device 130. For example, security program 200 can utilize the signal strength of a jamming transmission of a jamming device (e.g., user device 120) to determine a location of the jamming device. In this example, security program 200 can utilize a measuring receiver and GPS location of a UAV (e.g., client device 120) to identify a proximate location of the jamming device as the UAV traverses a cellular network (e.g., network 110) based on signal strength readings. Additionally, the present invention allows for a mobile platform that provides a proximate location of the jamming device which is more accurate than traditional systems due to increased line of sight channels due to increased portability of security program 200 being implemented on the mobile platform (i.e., traditional signal strength systems having a fixed tower would only be able to provide an estimated distance and direction of the jamming device based on the strength of the jamming signal).

In another example, security program 200 uses a mobile device (e.g., client device 120) to identify a geolocation a VBTS (e.g., user device 130) of a cellular network (e.g., network 110) that security program 200 has determined is performing an MITM attack. In this example, security program 200 retrieves a coverage map from a server of an ISP that includes the geographic area the mobile device is currently scanning and correlates one or more BTSs identified in the mobile device scan to the coverage map of the ISP. Also, security program 200 can identify a proximate geolocation of the VBTS based on known geolocations of authorized BTSs of the coverage map. In an alternative example, security program 200 can utilize a GPS location of a UAV (e.g., client device 120) to identify a proximate location of the VBTS determined to be performing the MITM attack.

In another embodiment, security program 200 transmits an alert to a user. For example, if security program 200 determines that a UAV (e.g., client device 120) is unable to connect to a BTS of a cellular network (e.g., network 110) after utilizing assessments to determine that a status of the BTS indicates the BTS is available. In this example, security program 200 can flag the connectivity issue as a possible jamming attack and transmit a reboot request (e.g., predetermined action) to the BTS via an onboard application (e.g., application 124) of the UAV. Additionally, security program 200 can instruct the UAV to attempt to connect to the BTS and, if the UAV is unable to connect to the BTS after the reboot request, then security program 200 may transmit an alert (e.g., predetermined action) to an ISP indicating the cellular network is experiencing a jamming attack.

In another example, if security program 200 identifies an unauthorized VBTS (e.g., user device 130) as performing a MITM attack on a cellular network (e.g., network 110), then security program 200 can transmit a notification to a user of a mobile device (not shown) connected to the VBTS and/or transmit a notification to an ISP. In this example, the notification can include metadata (e.g., VBTS location, VBTS identification number, identified symptoms, etc.) of an assessment of security program 200 or a notification message that informs a user of the mobile device to connect to an authorized BTS of the cellular network.

In another embodiment, security program 200 transmits a request to network 110. For example, if security program 200 determines that a mobile device (e.g., client device 120) is experiencing a latency issue when connecting to a BTS of a cellular network (e.g., network 110) after utilizing assessments as discussed in Step 204 to determine that the BTS is an unauthorized VBTS. In this example, security program 200 flags the latency issue as a MITM attack, and can utilize a client-side application (e.g., application 124) of the mobile device to transmit a shutdown request (e.g., predetermined action) to the cellular network to disable the unauthorized VBTS.

Figure 3:
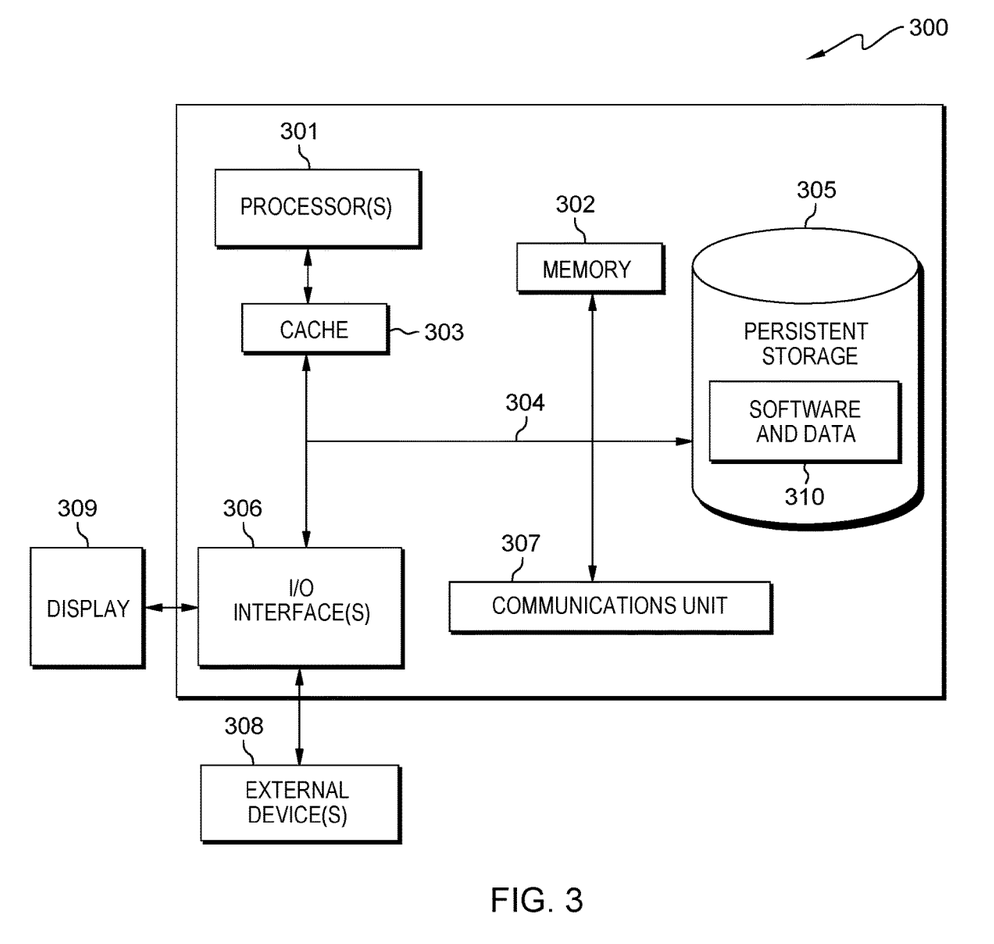
FIG. 3 is a block diagram of components of FIG. 1, in accordance with an embodiment of the present invention.

FIG. 3 depicts a block diagram of components of network 110, client device 120, user device 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122 and application 124. With respect to user device 130, software and data 310 includes data of transceiver 132 and identification numbers. With respect to server 140, software and data 310 includes data of storage device 142 and security program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    scanning, by one or more processors, a geographic area of a cellular network, wherein the geographic area includes a plurality of transceivers of the cellular network;
    identifying, by one or more processors, a symptom that impacts a transceiver of the cellular network based at least in part on connectivity between a computing device and the plurality of transceivers of the cellular network;
    performing, by one or more processors, one or more assessments on the transceiver of the cellular network impacted by the symptom, wherein performing the one or more assessments on the transceiver of the cellular network impacted by the symptom comprises correlating the plurality of transceivers of the scanned geographic area of the cellular network with a distribution map of one or more transceivers of the cellular network; and determining, by one or more processors, whether the symptom is associated with an attack on the cellular network based on the one or more assessments on the transceiver of the cellular network impacted by the symptom, wherein performing the one or more assessments on the transceiver of the cellular network impacted by the symptom, further comprises:
- identifying, by one or more processors, a total subscriber capacity of the transceiver;
- identifying, by one or more processors, a total number of current subscribers utilizing the transceiver;
- comparing, by one or more processors, the total number of current subscribers and the total subscriber capacity of the transceiver; and
- in response to determining that the total number of current subscribers is less than the total subscriber capacity of the transceiver, determining, by one or more processors, a status of the transceiver as available.

2. The method of claim 1, further comprising:
in response to determining that the symptom is associated with an attack on the cellular network, identifying, by one or more processors, a geolocation of a source of the attack on the cellular network, wherein the symptom includes an indication of a connectivity issue between the computing device and the transceiver of the cellular network, wherein the computing device is a mobile platform; and
transmitting, by one or more processors, a notification of the attack to a user, wherein the notification includes metadata of the attack, wherein the metadata includes the geolocation of the source of the attack and results of the one or more assessments.

3. The method of claim 2, wherein determining whether the symptom of the cellular network is associated with the attack on the cellular network based at least in part on the one or more assessments, further comprises:
- determining, by one or more processors, a status of the transceiver of the cellular network based at least in part on the one or more assessments;
- correlating, by one or more processors, the status of the one or more assessments with the connectivity issue of the symptom; and
- determining, by one or more processors, whether the connectivity issue of the symptom impacting the transceiver is associated with a jammer-based attack.

4. The method of claim 3, further comprising:
in response to determining that the connectivity issue of the symptom impacting the transceiver is associated with the jammer-based attack, transmitting, by one or more processors, a request to reboot the transceiver of the cellular network; and
reconnecting, by one or more processors, the mobile platform to the transceiver of the cellular network.

5. The method of claim 3, wherein identifying the geolocation of the source of the attack on the cellular network, further comprises:
scanning, by one or more processors, a geographic area proximate to the transceiver impacted by the jammer-based attack using the mobile platform for signal strength readings of a jammer-based attack, wherein the mobile platform is an unmanned aerial vehicle (UAV); and determining, by one or more processors, a location of a jamming device performing the jammer-based attack based on the signal strength readings of the mobile platform.

6. The method of claim 1, wherein performing the one or more assessments on the transceiver of the cellular network impacted by the symptom, further comprises:
- transmitting, by one or more processors, a request to access a controller of the transceiver;
- tracing, by one or more processors, a path of the request to access the controller of the transceiver;
- correlating, by one or more processors, a total number of connections of the path of the request to access the controller of the transceiver with a threshold value of connections, wherein the threshold value of connections is defined by a network structure of the cellular network; and
- determining, by one or more processors, whether a connectivity issue of the symptom impacting the transceiver is associated with an international mobile subscriber identity (IMSI) based attack.

7. The method of claim 1, wherein performing the one or more assessments on the transceiver of the cellular network impacted by the symptom, further comprises:
- authenticating, by one or more processors, with the transceiver of the cellular network;
- transmitting, by one or more processors, a network authentication request to the transceiver;
- validating, by one or more processors, a response of the transceiver to the network authentication request; and
- determining, by one or more processors, whether a connectivity issue of the symptom impacting the transceiver is associated with an IMSI based attack based at least in part on validating the response to the network authentication request.

8. The method of claim 1, wherein the one or more transceivers are authorized components of the cellular network, wherein the transceiver is included in the scanned plurality of transceivers of the geographic area of the cellular network, wherein performing the one or more assessments on the transceiver of the cellular network impacted by the symptom, further comprises:
determining, by one or more processors, whether a connectivity issue of the symptom impacting the transceiver is associated with an IMSI based attack based at least in part on verifying the transceiver of the cellular network using the distribution map of the cellular network.

9. The method of claim 8, further comprising:
in response to determining that the connectivity issue of the symptom impacting the transceiver is associated with the IMSI based attack, transmitting, by one or more processors, a request to disable the transceiver of the cellular network.

10. A computer program product comprising:
one or more computer readable storage media and program instructions stored on the one or more computer readable storage media, the program instructions comprising:
program instructions to scan a geographic area of a cellular network, wherein the geographic area includes a plurality of transceivers of the cellular network;
program instructions to identify a symptom that impacts a transceiver of the cellular network based at least in part on connectivity between a computing device and the plurality transceivers of the cellular network;

program instructions to perform one or more assessments on the transceiver of the cellular network impacted by the symptom;
program instructions to determine whether the symptom of the cellular network is associated with an attack on the cellular network based at least in part on the one or more assessments;
program instructions to transmit a request to access a controller of the transceiver;
program instructions to trace a path of the request to access the controller of the transceiver;
program instructions to correlate a total number of connections of the path of the request to access the controller of the transceiver with a threshold value of connections, wherein the threshold value of connections is defined by a network structure of the cellular network; and
program instructions to determine whether a connectivity issue of the symptom impacting the transceiver is associated with an international mobile subscriber identity (IMSI) based attack.

11. The computer program product of claim 10, further comprising program instructions, stored on the one or more computer readable storage media, to:
in response to determining that the symptom of the cellular network is associated with an attack on the cellular network, identify a geolocation of a source of the attack on the cellular network, wherein the symptom includes an indication of a connectivity issue between the computing device and the transceiver of the cellular network, wherein the computing device is a mobile platform; and
transmit a notification of the attack to a user, wherein the notification includes metadata of the attack, wherein the metadata includes the geolocation of the source of the attack and results of the one or more assessments.

12. The computer program product of claim 10, wherein program instructions to determine whether the symptom of the cellular network is associated with the attack on the cellular network based at least in part on the one or more assessments, further comprise program instructions to:
determine a status of the transceiver of the cellular network based at least in part on the one or more assessments;
correlate the status of the one or more assessments with the connectivity issue of the symptom; and
determine whether the connectivity issue of the symptom impacting the transceiver is associated with a jammer-based attack.

13. The computer program product of claim 12, wherein program instructions to identify the geolocation of the source of the attack on the cellular network, further comprise program instructions to:
scan a geographic area proximate to the transceiver impacted by the jammer-based attack using the mobile platform for signal strength readings of a jammer-based attack, wherein the mobile platform is an unmanned aerial vehicle (UAV); and
determine a location of a jamming device performing the jammer-based attack based on the signal strength readings of the mobile platform.

14. The computer program product of claim 10, wherein program instructions to perform the one or more assessments on the transceiver of the cellular network impacted by the symptom, further comprise program instructions to:
correlate the scanned plurality of transceivers of the geographic area of the cellular network with a distribution map of one or more transceivers of the cellular network, wherein the one or more transceivers are authorized components of the cellular network, wherein the transceiver is included in the scanned plurality of transceivers of the geographic area of the cellular network; and
determine whether a connectivity issue of the symptom impacting the transceiver is associated with an IMSI based attack based at least in part on verifying the transceiver of the cellular network using the distribution map of the cellular network.

15. A computer system comprising:
one or more computer processors;
one or more computer readable storage media; and
program instructions stored on the computer readable storage media for execution by at least one of the one or more processors, the program instructions comprising:
program instructions to scan a geographic area of a cellular network, wherein the geographic area includes a plurality of transceivers of the cellular network;
program instructions to identify a symptom that impacts a transceiver of the cellular network based at least in part on connectivity between a computing device and the plurality transceivers of the cellular network;
program instructions to perform one or more assessments on the transceiver of the cellular network impacted by the symptom;
program instructions to determine whether the symptom of the cellular network is associated with an attack on the cellular network based at least in part on the one or more assessments;
program instructions to identify a total subscriber capacity of the transceiver;
program instructions to identify a total number of current subscribers utilizing the transceiver;
program instructions to compare the total number of current subscribers and the total subscriber capacity of the transceiver; and
program instructions to determine, in response to determining that the total number of current subscribers is less than the total subscriber capacity of the transceiver, a status of the transceiver as available.

16. The computer system of claim 15, further comprising program instructions, stored on the one or more computer readable storage media for execution by at least one of the one or more processors, to:
in response to determining that the symptom of the cellular network is associated with an attack on the cellular network, identify a geolocation of a source of the attack on the cellular network, wherein the symptom includes an indication of a connectivity issue between the computing device and the transceiver of the cellular network, wherein the computing device is a mobile platform; and
transmit a notification of the attack to a user, wherein the notification includes metadata of the attack, wherein the metadata includes the geolocation of the source of the attack and results of the one or more assessments.

17. The computer system of claim 15, wherein program instructions to determine whether the symptom of the cellular network is associated with the attack on the cellular network based at least in part on the one or more assessments, further comprise program instructions to:
determine a status of the transceiver of the cellular network based at least in part on the one or more assessments;

correlate the status of the one or more assessments with the connectivity issue of the symptom; and determine whether the connectivity issue of the symptom impacting the transceiver is associated with a jammer-based attack.

18. The computer system of claim 17, wherein program instructions to identify the geolocation of the source of the attack on the cellular network, further comprise program instructions to:

scan a geographic area proximate to the transceiver impacted by the jammer-based attack using the mobile platform for signal strength readings of a jammer-based attack, wherein the mobile platform is an unmanned aerial vehicle (UAV); and determine a location of a jamming device performing the jammer-based attack based on the signal strength readings of the mobile platform.

19. The computer system of claim 15, wherein program instructions to perform the one or more assessments on the transceiver of the cellular network impacted by the symptom, further comprise program instructions to:

correlate the scanned plurality of transceivers of the geographic area of the cellular network with a distribution map of one or more transceivers of the cellular network, wherein the one or more transceivers are authorized components of the cellular network, wherein the transceiver is included in the scanned plurality of transceivers of the geographic area of the cellular network; and determine whether a connectivity issue of the symptom impacting the transceiver is associated with an IMSI based attack based at least in part on verifying the transceiver of the cellular network using the distribution map of the cellular network.

* * * * *